United States Patent
Kang et al.

(10) Patent No.: US 11,375,092 B2
(45) Date of Patent: Jun. 28, 2022

(54) IMAGE SENSOR AND IMAGE SENSING METHOD

(71) Applicant: SAMSUNG ELECTRONICS CO., LTD., Suwon-si (KR)

(72) Inventors: Deokyoung Kang, Suwon-si (KR); Yang Ho Cho, Seongnam-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 81 days.

(21) Appl. No.: 16/859,616

(22) Filed: Apr. 27, 2020

(65) Prior Publication Data

US 2020/0259979 A1    Aug. 13, 2020

Related U.S. Application Data

(63) Continuation-in-part of application No. 16/394,822, filed on Apr. 25, 2019, now Pat. No. 10,924,667.

(60) Provisional application No. 62/741,147, filed on Oct. 4, 2018.

(30) Foreign Application Priority Data

Dec. 4, 2018  (KR) .......................... 10-2018-0154741

(51) Int. Cl.
*H04N 5/225*   (2006.01)
*G02B 7/28*    (2021.01)
*H04N 5/232*   (2006.01)

(52) U.S. Cl.
CPC .......... *H04N 5/2254* (2013.01); *G02B 7/282* (2013.01); *H04N 5/23238* (2013.01)

(58) Field of Classification Search
CPC ............. H04N 5/2254; H04N 5/23238; H04N 5/23296; H04N 5/22541; H04N 5/23229; G02B 7/282; G02B 3/0056
See application file for complete search history.

(56) References Cited

U.S. PATENT DOCUMENTS

| | | | |
|---|---|---|---|
| 5,270,766 A * | 12/1993 | Nakamura | G02B 7/102 396/213 |
| 8,237,841 B2 | 8/2012 | Tanida et al. | |
| 9,025,077 B2 | 5/2015 | Attar et al. | |
| 9,167,138 B2 | 10/2015 | Shpunt et al. | |
| 9,578,257 B2 | 2/2017 | Attar et al. | |
| 9,671,595 B2 | 6/2017 | Laroia | |
| 9,871,980 B2 | 1/2018 | Pesach et al. | |
| 2004/0032523 A1 | 2/2004 | Hartlove | |
| 2005/0041134 A1 | 2/2005 | Takayama | |
| 2011/0134282 A1* | 6/2011 | Morita | G02B 13/001 348/234 |
| 2014/0111650 A1 | 4/2014 | Gorgeiev | |

(Continued)

FOREIGN PATENT DOCUMENTS

KR    10-2007-0065229 A    6/2007
KR    10-2015-0122514 A    11/2015

*Primary Examiner* — Mekonnen D Dagnew
(74) *Attorney, Agent, or Firm* — Sughrue Mion, PLLC

(57) ABSTRACT

An image sensor and an image sensing method are provided. The image sensor may restore a high resolution image with respect to a high magnification based on sensing information corresponding to different fields of view (FOVs) and that is received through lens elements having a same focal length and different lens sizes.

19 Claims, 16 Drawing Sheets

(56) References Cited

U.S. PATENT DOCUMENTS

2018/0152692 A1   5/2018  Cho et al.
2019/0150717 A1*  5/2019  Lu ..................... H04N 5/23238

* cited by examiner

IMAGE SENSOR AND IMAGE SENSING METHOD

CROSS-REFERENCE TO RELATED APPLICATIONS

This application is a continuation-in-part of U.S. application Ser. No. 16/394,822, filed Apr. 25, 2019, which claims priority from U.S. Provisional Application No. 62/741,147, filed on Oct. 4, 2018, in the U.S. Patent and Trademark Office, and Korean Patent Application No. 10-2018-0154741, filed on Dec. 4, 2018, in the Korean Intellectual Property Office, the disclosures of which are incorporated herein by reference in their entireties.

BACKGROUND

1. Field

Example embodiments consistent with the present disclosure relate to technology for sensing an image.

2. Description of the Related Art

Due to development of optical technologies and image processing technologies, image capturing apparatuses are being utilized in a wide range of fields, for example, multimedia content, security and recognition. For example, an image capturing apparatus may be mounted in a mobile device, a camera, a vehicle or a computer, to capture an image, to recognize an object or to acquire data to control a device. A size of an image capturing apparatus may be determined based on, for example, a size of a lens, a focal length of a lens or a size of a sensor. For example, the size of the image capturing apparatus may depend on a size of a lens or a size of a sensor. As the size of the sensor decreases, an amount of light incident on the sensor may decrease. Accordingly, a resolution of an image may decrease, or it may be difficult to capture an image in a low illuminance environment. To reduce the size of the image capturing apparatus, a multi-lens including small lenses may be used. When the size of the lens decreases, a focal length of the lens may decrease. Thus, the size of the image capturing apparatus may be reduced based on the multi-lens.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

One or more example embodiments provide an image sensor and an image sensing method.

In accordance with an aspect of the disclosure, an image sensor includes a lens array including a plurality of lens groups, each of the plurality of lens groups including at least one lens element, and a sensing array including a plurality of sensing elements spaced apart from the lens array and configured to sense light passing through the lens array, wherein a lens size of one lens group from among the plurality of lens groups is different from a lens size of another lens group from among the plurality of lens groups, and wherein a number of sensing elements arranged along one axis of the sensing array is determined based on a number of lenses for each of the plurality of lens groups.

The number of sensing elements arranged along one axis of the sensing array may be determined based on a least common multiple of the number of lenses for each of the plurality of lens groups.

The number of lenses for each of the plurality of lens groups may be determined based on a geometric progression.

The number of lenses for each of the plurality of lens groups may be determined based on an arithmetic progression.

The number of lenses for each of the plurality of lens groups may be determined based on a progression from which at least one prime number in an arithmetic progression is excluded.

The number of lenses for each of the plurality of lens groups may be determined based on a progression that is based on a number of lenses included in a lens group corresponding to a default zoom.

Each lens group from among the plurality of lens groups may correspond to a respective lens size such that for each lens group from among the plurality of lens groups, lens elements included in the lens group have the corresponding lens size.

For each lens group from among the plurality of lens groups, lens elements included in the lens group may be located adjacent to each other.

One lens group from among the plurality of lens groups may include a single lens element.

At least one lens element from among the plurality of lens elements may be arranged to cover less than an entire portion of at least one sensing element from among the plurality of sensing elements.

A processor may be configured to restore an image based on sensing information sensed by the plurality of sensing elements so that a resolution of a central region within a field of view (FOV) of the lens array is higher than a resolution of a region adjacent to the central region.

The image sensor may further include a processor configured to acquire a compound eye vision (CEV) image based on sensing information sensed by the plurality of sensing elements.

The processor may be further configured to rearrange pixels included in the CEV image based on light field (LF) information sensed by the plurality of sensing elements.

The processor may be further configured to restore a scene image from the CEV image based on a geometric relationship between the plurality of sensing elements and the plurality of lens elements.

The processor may be further configured to restore a scene image from the CEV image based on an image restoration model that is completely trained before the CEV image is acquired.

The image sensor may further include a processor configured to select target sensing information from among sensing information sensed by the plurality of sensing elements, the target sensing information corresponding to a zoom factor designated by a user, wherein the processor is further configured to restore a scene image based on the selected target sensing information.

The processor may be further configured to select, as the target sensing information, information corresponding to a field of view corresponding to the designated zoom factor.

Each lens element from among the plurality of lens elements may be configured to refract incident light and to form a focal point of light exiting the lens element at a point on a sensing array including the plurality of sensing elements.

In accordance with an aspect of the disclosure, an image sensing method includes sensing, by a sensing array including a plurality of sensing elements, light passing through a lens array including a plurality of lens groups, each including at least one lens element, and restoring, by a processor, a scene image based on an intensity of the light sensed by the sensing array, wherein a lens size of one lens group from among the plurality of lens groups is different from a lens size of another lens group from among the plurality of lens groups, and wherein a number of sensing elements arranged along one axis of the sensing array is determined based on a number of lenses for each of the plurality of lens groups.

In accordance with an aspect of the disclosure, a camera includes a lens array including a plurality of lens groups, each of the plurality of lens groups including at least one lens element, and a sensing array including a plurality of sensing elements spaced apart from the lens array and configured to sense light passing through the lens array, wherein a lens size of one lens group from among the plurality of lens groups is different from a lens size of another lens group from among the plurality of lens groups, and wherein a number of sensing elements arranged along one axis of the sensing array is determined based on a number of lenses for each of the plurality of lens groups.

BRIEF DESCRIPTION OF THE DRAWINGS

The above and/or other aspects will be more apparent from the following description of example embodiments taken in conjunction with the accompanying drawings, in which.

DETAILED DESCRIPTION

Figure 1:
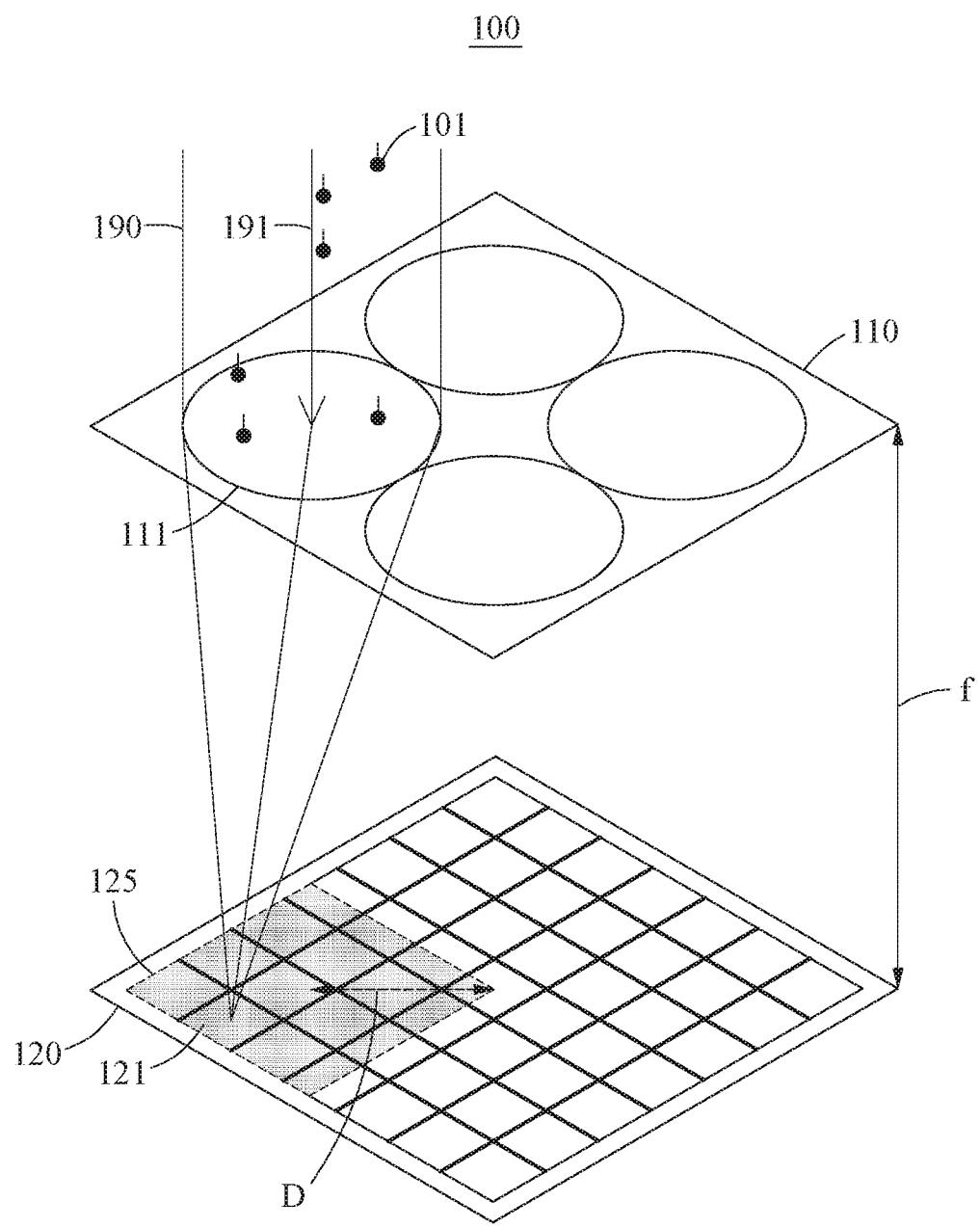
FIG. 1 is a diagram illustrating a structure of an image sensor according to an example embodiment.

Reference will now be made in detail to example embodiments which are illustrated in the accompanying drawings, wherein like reference numerals refer to the like elements throughout. Example embodiments are described below in order to explain the present disclosure by referring to the figures.

The following structural or functional descriptions merely describe the example embodiments, and the scope of the example embodiments is not limited to the descriptions provided in the present specification. Various changes and modifications can be made thereto by those of ordinary skill in the art.

It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in general dictionaries should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings.

FIG. 1 is a diagram illustrating a structure of an image sensor according to an example embodiment.

A quality of an image captured and restored by an image sensor 100 may be determined based on a number of sensing elements included in a sensing array 120 and an amount of light incident on a sensing element. For example, a resolution of the image may be determined based on the number of the sensing elements included in the sensing array 120, and a sensitivity of the image may be determined based on the amount of light incident on the sensing element. The amount of light incident on the sensing element may be determined based on a size of the sensing element. When the size of the sensing element increases, the amount of light incident on the sensing element and a dynamic range of the sensing array 120 may increase. On the other hand, a resolution of an image captured by the image sensor 100 may increase as the number of the sensing elements included in the sensing array 120 increases. Also, as the size of the sensing element increases, the image sensor 100 may improve the quality of high sensitivity imaging at a low illuminance.

A size (volume) of the image sensor 100 may be determined based on a focal length f of a lens element 111. For example, the size of the image sensor 100 may be determined based on a gap between the lens element 111 and the sensing array 120. Because the sensing array 120 needs to be located at the focal length f of the lens element 111 to collect light 190 refracted by the lens element 111, the sensing array 120 and the lens element 111 included in the image sensor 100 may need to be spaced apart from each other by a distance equal to the focal length f of the lens element 111. The focal length f of the lens element 111 may be determined based on a field of view (FOV) of the image sensor 100 and a size of the lens element 111, for example, a radius of an aperture of the lens element 111. For example, when the FOV is fixed, the focal length f may increase in proportion to the size of the lens element 111. Also, the size of the lens element 111 may be determined based on a size of the sensing array 120. For example, to capture an image within a predetermined FOV, the size of the lens element 111 may need to increase as the size of the sensing array 120 increases.

As described above, to increase a sensitivity of an image while maintaining a FOV and a resolution of the image, the size of the image sensor 100 may be increased. For example, to increase a sensitivity of an image while maintaining a resolution of the image, a size of each sensing element included in the sensing array 120 may need to increase while maintaining the same number of sensing elements. Thus, the size of the sensing array 120 may increase. In this example, to maintain the FOV, the size of the lens element 111 may increase as the size of the sensing array 120 increases, and the focal length f of the lens element 111 may increase. Thus, the size of the image sensor 100 may increase.

To reduce the size of the image sensor 100, design schemes for reducing a size of a sensing element while maintaining the resolution of the sensing array 120, or for reducing the resolution of the sensing array 120 while maintaining the size of the sensing element may be used. In an example, when the size of the sensing element is reduced while maintaining the resolution of the sensing array 120, the size of the sensing array 120 and the focal length f of the lens element 111 may decrease, which may lead to a decrease in the size of the image sensor 100. However, in this example, a sensitivity of the image may also decrease, and a quality of an image under low illuminance may be reduced. In another example, when the resolution of the sensing array 120 is reduced while maintaining the size of the sensing element, the size of the sensing array 120 and the focal length f of the lens element 111 may decrease, which may lead to a decrease in the size of the image sensor 100. However, in this example, a resolution of an image may also decrease.

Referring to FIG. 1, the image sensor 100 may include a lens array 110 and the sensing array 120. The lens array 110 may include lens elements 111, and the sensing array 120 may include sensing elements 121.

When a size of each of the lens elements included in the lens array 110 decreases, that is, when a number of lens elements per unit area of the lens array 110 increases, the focal length f of the lens element 111 and the thickness of the image sensor 100 may decrease. In this example, the image sensor 100 may restore a high resolution image by rearranging and combining low resolution images passing through individual lens elements 111. Thus, a thinner camera may be implemented by increasing the number of lens elements in the lens array 110.

As shown in FIG. 1, lens element 111 of the lens array 110 may cover a predetermined sensing region 125 of the sensing array 120 corresponding to a size of the lens element 111. The sensing region 125 covered by the lens element 111 may be determined based on the size of the lens element 111. The sensing region 125 may refer to a region on the sensing array 120 that is reached by rays within a predetermined FOV by passing through the lens element 111. A size of the sensing region 125 may be represented as a distance D from a central point of the sensing region 125 to an outermost point of the sensing region 125. The light 190 passing through the lens element 111 may be incident on sensing elements of the sensing array 120 included in the sensing region 125. The light 190 may include a plurality of rays. A ray 191 may correspond to a flow (i.e., a path) of a photon 101.

For example, a lens size may correspond to a diameter of the lens.

Each of the sensing elements in the sensing array 120 may generate sensing information based on incident rays 191 passing through the lens elements 111 included in the lens array 110. For example, a sensing element 121 may generate sensing information based on the ray 191 incident through the lens element 111. The image sensor 100 may determine intensity information corresponding to an original signal associated with points included in a FOV of the image sensor 100 based on the sensing information output from the sensing array 120. Also, the image sensor 100 may restore a captured image based on the determined intensity information.

The sensing element 121 may also include a color filter to sense an arbitrary color. In this case, the sensing element 121 may generate a color value corresponding to a predetermined color as sensing information. Each of the sensing elements included in the sensing array 120 may be located to sense a color different from that of a neighboring sensing element that is spatially adjacent to the sensing element. However, an arrangement of the sensing element 121 and the color filter of the sensing element 121 are not limited thereto.

When a diversity of sensing information is sufficiently secured and when a full rank relationship between the sensing information and original signal information corresponding to the points in the FOV of the image sensor 100 is formed, a captured image corresponding to a maximum resolution of the sensing array 120 may be derived. The diversity of sensing information may be secured based on parameters of the image sensor 100, for example, a number of lens elements included in the lens array 110 or a number of sensing elements included in the sensing array 120.

Although not shown in FIG. 1, the image sensor 100 may include a memory configured to store an image restoration model used to restore an image, and a processor configured to restore an image using the image restoration model stored in the memory.

The image sensor 100 may restore an image robustly against various noise components that deviate from ideal conditions. Also, the image sensor 100 may restore an image without being affected by an arbitrary pattern such as a Bayer pattern that may be arranged on the sensing elements. Examples of an operation of restoring a high resolution image based on a plurality of low resolution images captured using multiple lenses by the image sensor 100 will be described below. The plurality of low resolution images that are used in combination to form a high resolution image may collectively be referred to as a compound eye vision (CEV) image.

Figure 2:
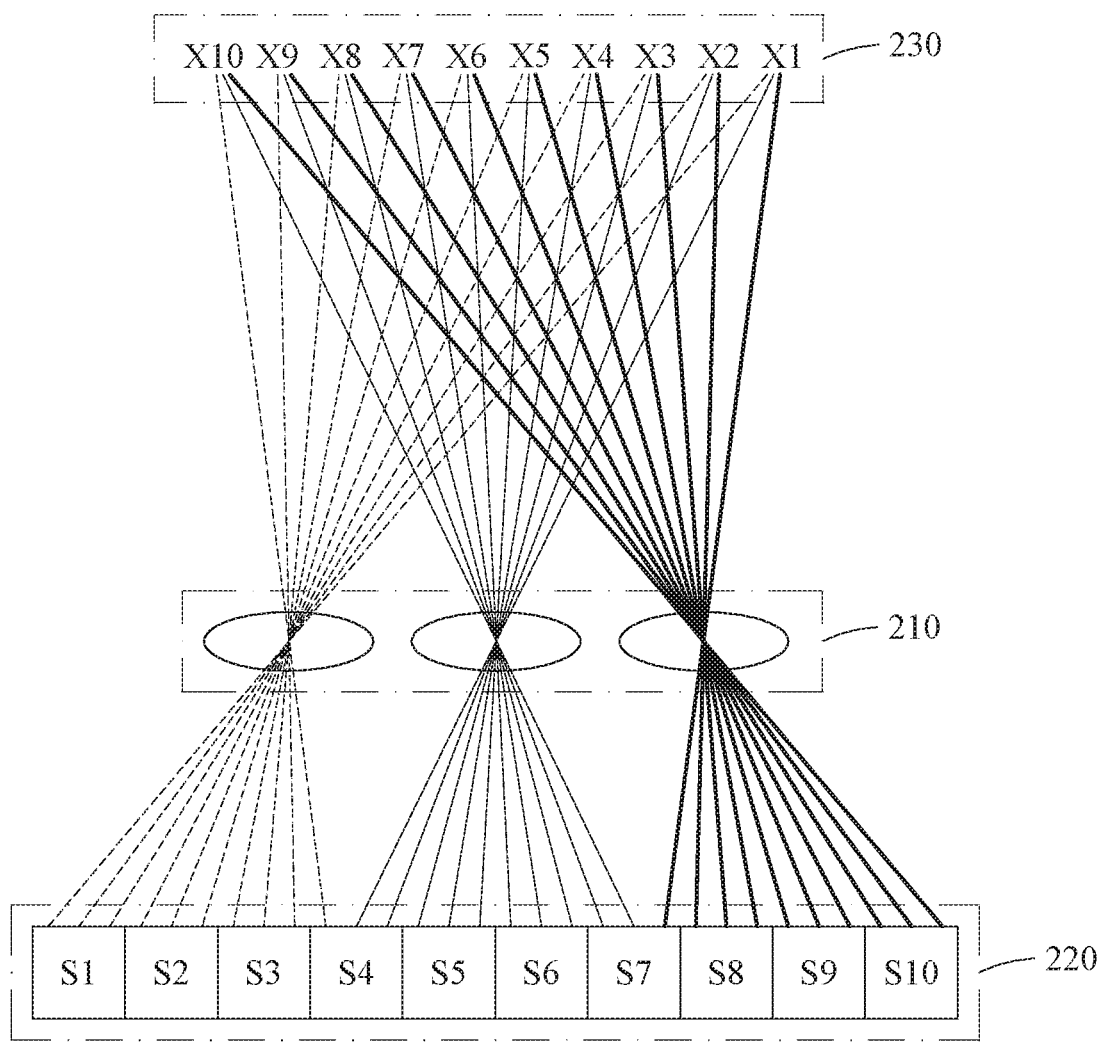
FIG. 2 is a diagram illustrating an example in which a sensing element receives a ray through a lens element according to an example embodiment.

FIG. 2 is a diagram illustrating an example in which sensing elements receives rays through lens elements according to an example embodiment.

As described above, a sensing array 220 may receive rays corresponding to individual points 230 shown as X1 through X10. The rays may be detected by the sensing array 220 through a lens array 210. For example, a plurality of rays may be emitted from each of the individual points 230. Rays emitted from the same point may form a light field (LF). An LF emitted from an arbitrary point on a subject may be a field that indicates both the intensities and the directions of rays reflected from the arbitrary point on the subject. For example, rays emitted from a first point X1 may form a first LF, and may be incident on a first sensing element S1, a fourth sensing element S4 and a seventh sensing element S7. Rays emitted from each of the other points, that is, points X2 through X10 may also form a corresponding LF. The individual points 230 may be, for example, points on an arbitrary object that may be a subject of imaging. Rays emitted from the individual points 230 may be, for example, rays obtained when sunlight is reflected by the surface of an object. Although the lens array 210 includes three lens elements and the sensing array 220 includes ten sensing elements (for example, sensing elements S1 through S10) as shown in FIG. 2 for convenience of description, example embodiments are not limited thereto.

The sensing elements S1 through S10 may sense rays that pass through a plurality of lens elements and that overlap each other. For example, in the lens array 210 of FIG. 2, a focal length between a lens element and the sensing array 220 may be reduced. Thus, the first sensing element S1 may generate sensing information, for example, an intensity value, that is the sum of intensity values of rays that are radiated from the points X1 through X3 and that overlap each other. Thus, information generated by each sensing element includes original signal information from multiple points 230. An image sensor may restore the original signal information from the sensing information using a model as described below, for example.

The sensing information generated by the sensing elements S1 through S10 may be modeled to be original signal information, for example, an intensity value, corresponding to a ray incident from each of the points 230, as shown in Equation 1 below.

$$S = T \cdot X \quad \text{[Equation 1]}$$

In Equation 1, S denotes a matrix representing sensing information, for example, a detected intensity value, sensed by each of sensing elements. X denotes a matrix representing an original signal value, for example, a color value of an incident ray, corresponding to a ray incident on the sensing elements S1 through S10 from each point. T denotes a transformation matrix that represents a relationship between sensing information detected by the sensing elements S1 through S10 and original signal information corresponding to an incident ray. Rays corresponding to the individual points X1 through X10, the lenses, and the sensing elements S1 through S10 in the structure of FIG. 2 may be modeled as shown in Equation 2 below. In Equation 2, the individual points X1 through X10 may be modeled to be located at an infinite focal point from the image sensor. For example, a distance between the image sensor and each of the individual points X1 through X10 may be greater than a threshold distance.

$$\begin{bmatrix} S1 \\ S2 \\ S3 \\ S4 \\ S5 \\ S6 \\ S7 \\ S8 \\ S9 \\ S10 \end{bmatrix} = \begin{bmatrix} 1 & 1 & 1 & 0 & 0 & 0 & 0 & 0 & 0 & 0 \\ 0 & 0 & 0 & 1 & 1 & 1 & 0 & 0 & 0 & 0 \\ 0 & 0 & 0 & 0 & 0 & 0 & 1 & 1 & 1 & 0 \\ 1 & 1 & 0 & 0 & 0 & 0 & 0 & 0 & 0 & 1 \\ 0 & 0 & 1 & 1 & 1 & 0 & 0 & 0 & 0 & 0 \\ 0 & 0 & 0 & 0 & 0 & 1 & 1 & 1 & 0 & 0 \\ 1 & 0 & 0 & 0 & 0 & 0 & 0 & 0 & 1 & 1 \\ 0 & 1 & 1 & 1 & 0 & 0 & 0 & 0 & 0 & 0 \\ 0 & 0 & 0 & 0 & 1 & 1 & 1 & 0 & 0 & 0 \\ 0 & 0 & 0 & 0 & 0 & 0 & 0 & 1 & 1 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix}$$

For convenience of description in Equation 2, X1 through X10 denote original signal information, for example, a ray intensity value, of a ray corresponding to each of the individual points X1 through X10. Also, S1 through S10 denote sensing information, for example, a sensing intensity value, detected by the sensing elements S1 through S10. For example, a relationship, for example, the above-described transformation matrix, between the sensing information, for example, color information, corresponding to the sensing elements S1 through S10 included in the sensing array 220 and an original signal corresponding to rays incident from the individual points X1 through X10 may be determined based on an arrangement of a lens element and a sensing element, a number of lens elements included in the lens array 210, or a number of sensing elements S1 through S10 included in the sensing array 220. In the example shown in FIG. 2, the transformation matrix T is determined based on there being ten sensors S1 through S10 and three lens elements.

An example in which each of the individual points X1 through X10 is located at an infinite focal point from the image sensor is described with reference to Equation 2. For example, when each of the individual points X1 through X10 is located at a finite focal point from the image sensor, the original signal sensed by each sensing element may change based on a distance between a subject and the image sensor and a geometric structure of the image sensor.

Figure 3:
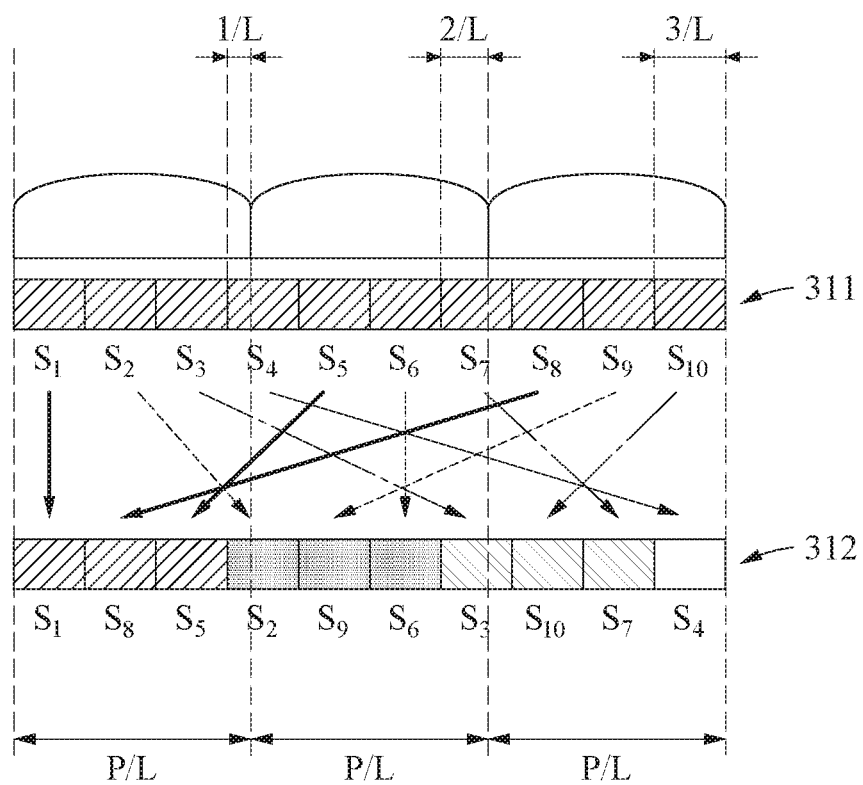
FIG. 3 is a diagram illustrating a relationship between a number of sensing elements and a number of lens elements according to an example embodiment.

FIG. 3 is a diagram illustrating a relationship between a number of sensing elements and a number of lens elements according to an example embodiment.

At least one of a plurality of lens elements may be arranged eccentrically with respect to at least one of a plurality of sensing elements. In other words, at least one lens element may cover less than an entire portion of at least one sensing element. For example, the plurality of lens elements may be arranged eccentrically, and may not be in a one-to-one relationship with the plurality of sensing elements. A lens element may cover a non-integer number of sensing elements, instead of covering an integer number of sensing elements. In an example, a multi-lens array structure may be implemented as a fractional alignment structure. Parameters of the multi-lens array structure may include, for example, a number P of sensing elements and a number L of lens elements. A ratio P/L between the number P of sensing elements and the number L of lens elements may be determined as a non-integer rational number. Each of the lens elements may cover the same number of sensing elements P/L as a pixel offset. In FIG. 3, ten sensing elements and three lens elements are shown. Therefore, each of the lens elements covers 10/3, or approximately 3.33 sensing elements.

As described above, an image sensor may have an arrangement of lens elements that have slightly different optical center axes (OCAs) than those of sensing elements in a sensing array. Thus, lens elements included in a lens array may receive different LF information. Since a direction of a chief ray of each of the lens elements is also changed, the image sensor may optically acquire a larger amount of sensing information. Thus, the image sensor may restore an image with a higher resolution based on a variety of sensing information acquired as described above.

When lens elements included in a lens array all have the same lens size, a number of lens elements in the lens array and a number of sensing elements included in the sensing array may satisfy Equation 3 as shown below. In this example, the number of lens elements and the number of sensing elements may be relatively prime.

$$R = P = L \times N + 1 \quad \text{[Equation 3]}$$

In Equation 3, R denotes an integer indicating a resolution of a sensing array with respect to one axis (i.e., the number of sensing elements in a single row of the sensing array), P denotes an integer indicating a number of sensing elements in the sensing array with respect to one axis, L denotes an integer indicating a number of lens elements in a lens array with respect to one axis (i.e., the number of lens elements in a single row of the lens array), and N denotes an arbitrary natural number to satisfy Equation 3. In Equation 3, R, P, and L may be represented on a two-dimensional (2D) plane. For example, the resolution R may be a resolution of the image sensor with respect to a horizontal axis or a vertical axis. The resolution R with respect to the horizontal axis or the vertical axis may correspond to the number P of sensing elements in a single row in a direction corresponding to the horizontal or vertical axis. In this example, L may indicate a number of lens elements based on the corresponding axis. Thus, a full two-dimensional resolution of the sensing array may be represented by R×R, a total number of sensing elements in the two-dimensional sensing array may be P×P, and a total number of lens elements in the two-dimensional lens array may be L×L.

For example, FIG. 3 illustrates a cross-sectional view of a horizontal axis or a vertical axis of the image sensor. With respect to one axis, the number L of lens elements may be 3 and the number P of sensing elements may be 10, to satisfy a relatively prime relationship. In this example, approximately 3.33 sensing elements may be covered by each lens element with respect to the axis.

In FIG. 3, a first lens element may cover all of sensing elements $S_1$ through $S_3$ and ⅓ of sensing element $S_4$. A second lens element may cover the remaining ⅔ of sensing element $S_4$, all of sensing elements $S_5$ and $S_6$, and ⅔ of sensing element $S_7$. Similarly, a last lens element may cover the remaining ⅓ of sensing element $S_7$ and all of sensing elements $S_8$ through $S_{10}$. In other words, each of the lens elements may cover a portion of at least one sensing element corresponding to the same disparity as 1/L (i.e., a portion of a sensing element that is an integer multiple of 1/L) where L is the number of lenses.

Based on the above-described geometric structure of the lens array and the sensing array, LF information from the combination of points 230 sensed by a sensing element covered by one lens element may be different from LF information from the combination of points 230 sensed by a sensing element covered by another lens element. LF information may refer to information about a combination of a plurality of LFs from a plurality of points 230. For example, a first sensing element S1 may sense LF information with a combination of a first LF of the first point X1 of FIG. 2, a second LF of the second point X2 and a third LF of the third point X3. On the other hand, a second sensing element S2 adjacent to the first sensing element S1 may sense LF information with a combination of a fourth LF, a fifth LF and a sixth LF in the structure of FIG. 2. Thus, one sensing element may sense LF information different from LF information sensed by another sensing element.

The image sensor may rearrange positions of pixels of a captured image based on a correlation between LF information. For example, the image sensor may rearrange pixels of a captured image, for example, a CEV image, to generate an output image in which pixels of sensing elements that sense similar LF information among the plurality of sensing elements are adjacent to each other.

The image sensor may rearrange pixels indicating an intensity value of a signal sensed by an individual sensing element, based on a similarity between LF sensed by the sensing element and LF information sensed by another sensing element, as shown in FIG. 3. For example, it may be determined that a similarity between the LF information of two sensing elements increases as the number of overlapping LFs in LF information sensed by the two sensing elements increases.

When points reflecting rays are assumed to be at an infinite focal point from the image sensor, the image sensor may determine the LF information sensed by each of the sensing elements. For example, the image sensor may determine points that emit an LF sensed by each of the plurality of sensing elements based on a position relationship between the plurality of sensing elements and rays radiated from points spaced apart from the image sensor by a distance greater than a threshold distance. A point spaced apart from the image sensor by the distance greater than the threshold distance may also be referred to as a "point at an infinite focal point." The image sensor may rearrange pixels such that pixels representing points that are spatially adjacent to each other in a subject of imaging are adjacent to each other in the output image.

The individual points X1 through X10 of FIG. 2 are adjacent to each other in an order shown in FIG. 2. For example, the first point X1 may be adjacent to the second point X2, and the second point X2 may be adjacent to the first point X1 and the third point X3. Two adjacent points may be, for example, points that are spatially adjacent to each other in a subject.

Both LF information sensed by the first sensing element S1 and LF information sensed by an eighth sensing element S8 among the sensing elements 311 that are not rearranged may include LFs from both of the second point X2 and the third point X3. Thus, the first sensing element S1 and the eighth sensing element S8 may be determined to sense similar LF information. When pixels corresponding to similar LF information are rearranged to be adjacent to each other, Equation 2 may be represented as shown in Equation 4 below.

$$\begin{bmatrix} S1 \\ S8 \\ S5 \\ S2 \\ S9 \\ S6 \\ S3 \\ S10 \\ S7 \\ S4 \end{bmatrix} = \begin{bmatrix} 1 & 1 & 1 & 0 & 0 & 0 & 0 & 0 & 0 & 0 \\ 0 & 1 & 1 & 1 & 0 & 0 & 0 & 0 & 0 & 0 \\ 0 & 0 & 1 & 1 & 1 & 0 & 0 & 0 & 0 & 0 \\ 0 & 0 & 0 & 1 & 1 & 1 & 0 & 0 & 0 & 0 \\ 0 & 0 & 0 & 0 & 1 & 1 & 1 & 0 & 0 & 0 \\ 0 & 0 & 0 & 0 & 0 & 1 & 1 & 1 & 0 & 0 \\ 0 & 0 & 0 & 0 & 0 & 0 & 1 & 1 & 1 & 0 \\ 0 & 0 & 0 & 0 & 0 & 0 & 0 & 1 & 1 & 1 \\ 1 & 0 & 0 & 0 & 0 & 0 & 0 & 0 & 1 & 1 \\ 1 & 1 & 0 & 0 & 0 & 0 & 0 & 0 & 0 & 1 \end{bmatrix} \cdot \begin{bmatrix} X1 \\ X2 \\ X3 \\ X4 \\ X5 \\ X6 \\ X7 \\ X8 \\ X9 \\ X10 \end{bmatrix} \quad \text{[Equation 4]}$$

Referring to FIG. 3, sensing elements 312 are rearranged based on Equation 4. In the actual sensing array, first sensing element S1 may be covered by the first lens, the eighth sensing element S8 may be covered by the third lens, and a fifth sensing element S5 may be covered by the second lens. After rearrangement of pixels based on Equation 4, the three pixels corresponding to first sensing element S1, eighth sensing element S8, and fifth sensing element S5 are arranged to be adjacent to each other.

The image sensor may apply a rearrangement and restoration to an image captured by the lens array and the sensing array that satisfy a relatively prime condition and Equation 3, to restore a high resolution scene image with colors more similar to the original scene.

Figure 4:
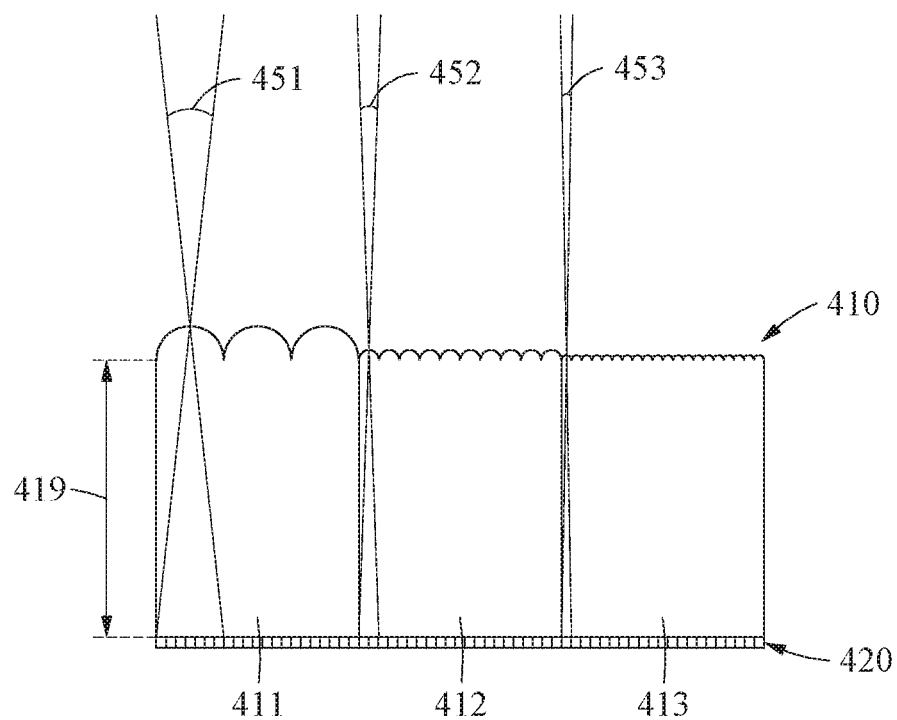
FIG. 4 is a diagram illustrating a number of lens elements and a size of a lens element that are determined based on a focal length and a desired field of view (FOV) in a lens array according to an example embodiment.

FIG. 4 is a diagram illustrating a number of lens elements and a size of a lens element that are determined based on a focal length and a desired FOV in a lens array according to an example embodiment.

An image sensor may include a lens array 410 and a sensing array 420, as described above. The lens array 410 may include a plurality of lens elements. A lens size of at least one of the plurality of lens elements may be different from that of another lens element.

For example, the plurality of lens elements may be classified into a plurality of lens groups based on a lens size. The lens groups may be groups of lens elements classified by the lens size. For example, lens elements included in the same lens group may have the same lens size, and lens elements included in different lens groups may have different lens sizes. In other words, the lens size corresponding to any one lens group may be different from the lens sizes corresponding to all other lens groups. The image sensor may include lens elements with various FOVs. A FOV of a lens element may be represented as shown in Equation 5 below.

$$FOV = 2 \cdot \arctan\left(\frac{D}{F}\right) \quad \text{[Equation 5]}$$

In Equation 5, FOV denotes a FOV, D denotes a size of a sensing region covered by the lens element, and F denotes a focal length 419.

The image sensor may be implemented in (i.e., included in) a mobile terminal, and the focal length 419 may be limited to satisfy a form factor of the mobile terminal. For example, the focal length 419 may be less than a thickness of the mobile terminal. To implement the image sensor in the mobile terminal, lens groups may be designed such that they all have the same focal length 419. Additionally, the lens groups may all have different FOVs from one another.

To acquire information of a distant subject, the image sensor may include the lens array 410 including lens groups with various FOVs. For example, when the focal length 419 is fixed for all lens elements as described above, and when FOV of Equation 5 changes, a size (for example, D of Equation 5) of a sensing region covered by a lens element may change. For example, the lens array 410 may be designed so that a number of lens elements included in the lens group increases with an increase of a zoom factor of the lens group. In this example, based on a design of the lens array 410, the relationship between FOV and the size of the sensing region enables a constant focal length of the lens group to be maintained. Also, a lens size of lens elements included in the lens group may decrease as a zoom factor of the lens group increases. A lens size of each of lens elements included in the lens group may decrease as the number of the lens elements included in the lens group increases. Thus, a number of lens elements included in an arbitrary lens group may be determined based on a lens size, which may itself be determined based on a focal length and a FOV of the lens group.

Also, for each lens group i, a number of lens elements shown along one axis of the lens array 410 (i.e., a number of lens elements in each row of the lens group) may satisfy Equation 6 as shown below.

$$R_i = L_i \times \mathbb{N}_i + 1 \text{ s.t. } i=1,\ldots,M \quad \text{[Equation 6]}$$

In Equation 6, $R_i$ denotes a resolution of an image sensed by an i-th lens group (i.e., a number of sensing elements in each row of a sensing region corresponding to the lens group), $L_i$ denotes a number of lens elements corresponding to the i-th lens group lens along one axis of the lens array 410, $N_i$ denotes an arbitrary natural number, and M denotes a number of lens groups included in the lens array 410. $R_i$, $L_i$, $N_i$, and M may each be an integer greater than or equal to 1. Also, i may be an integer greater than or equal to 1 and less than or equal to M. For example, a number of i-th lens elements included in the i-th lens group may be $L_i \times L_i$.

FIG. 4 is a cross-sectional view of the lens array 410 in which the number M of lens groups is 3. For convenience of description, a first lens group 411, a second lens group 412, and a third lens group 413 are shown sequentially from the left. $L_1$ may represent a number of lens elements corresponding to the first lens group 411 along one axis of the lens array 410, and may be 3, as shown in FIG. 4. $L_2$ may represent a number of lens elements corresponding to the second lens group 412 along one axis of the lens array 410, and may be 9, as shown in FIG. 4. $L_3$ may represent a number of lens elements corresponding to the third lens group 413 along one axis of the lens array 410, and may be 27, as shown in FIG. 4. Since the cross-sectional view based on one axis with respect to the image sensor is also shown in FIG. 4 as described above with reference to FIG. 3, $L_1$, $L_2$, and $L_3$ may each be a number of lens elements along the axis. The first lens group 411 may include nine first lens elements obtained by 3×3 (i.e., three rows of lens elements each including three lens elements), the second lens group 412 may include 81 second lens elements obtained by 9×9 (i.e., nine rows of lens elements each including nine lens elements), and the third lens group 413 may include 729 third lens elements obtained by 27×27 (i.e., 27 rows of lens elements each including 27 lens elements).

The first lens group 411 may transfer rays within a first FOV 451, for example, 77 degrees, to a first sensing element. The first sensing element may be covered by a first lens element included in the first lens group 411, and may receive light passing through the first lens element. The first sensing element may sense information corresponding to a first zoom factor, for example, a zoom factor of 1×. The second lens group 412 may transfer rays within a second FOV 452, for example, 30 degrees, to a second sensing element. The second sensing element may be covered by a second lens element included in the second lens group 412, and may receive light passing through the second lens element. The second sensing element may sense information corresponding to a second zoom factor, for example, a zoom factor of 3×. The third lens group 413 may transfer rays within a third FOV 453, for example, 10 degrees, to a third sensing element. The third sensing element may be covered by a third lens element included in the third lens group 413, and may receive light passing through the third lens element. The third sensing element may sense information corresponding to a third zoom factor, for example, a zoom factor of 9×.

For example, the image sensor may be implemented as a single sensor, or a plurality of sensors that each include the same sensing elements. In this example, the image sensor may be designed so that each lens group may support the same resolution. For example, a sensing region covered by any one of the lens groups may include the same number of sensing elements as that of another lens group. In this example, a number of lens elements R shown along one axis of the lens array 410 may satisfy Equations 7, 8 and 9 shown below.

$$R = L_M \times \mathbb{N}_M + 1 \quad \text{[Equation 7]}$$

$$L_M = \alpha_i \times L_i \text{ s.t. } i = 1, \ldots, M-1 \quad \text{[Equation 8]}$$

$$R = L_M \times \mathbb{N}_M + 1 = L_i \times \mathbb{N}_i + 1 \text{ s.t. } \mathbb{N}_i = \alpha_i \times \mathbb{N}_M \quad \text{[Equation 9]}$$

In Equations 7 through 9, R denotes a resolution corresponding to one axis of a lens array shared by all lens groups. $L_M$ denotes a number of lens elements that correspond to an M-th lens group along one axis of the lens array. $L_i$ denotes a number of lens elements that correspond to an i-th lens group along one axis of the lens array. $\mathbb{N}_M$, $\mathbb{N}_i$, and $\alpha_i$ each denote an arbitrary natural number. A number of lens elements included in each of a plurality of lens groups may be determined based on a resolution shared by the plurality of lens elements. Thus, based on Equation 9, which is derived by substituting the expression for $L_M$ of Equation 8 into the expression for R of Equation 7, each of the lens groups may have a resolution shared by all the lens groups. Further, each of the lens groups may include a number of lens elements which is relatively prime to a number of sensing elements covered by each of the lens elements.

Thus, the image sensor may apply a rearrangement and restoration to an image captured by the lens array 410 and the sensing array 420 that satisfy a relatively prime condition and Equation 9, to restore a high resolution scene image with colors more similar to the original scene.

For example, the image sensor may rearrange an image acquired by a camera that uses lens elements arranged in a Bayer pattern and a color sensor (for example, a sensor to sense an image of a red channel, a green channel and a blue channel in a visible light band) in which sensing elements are arranged in a Bayer pattern, in an order of similar LFs, as described above. The image sensor may obtain a uniform color pattern, to provide a color interpolation with a higher performance.

Figure 5A:
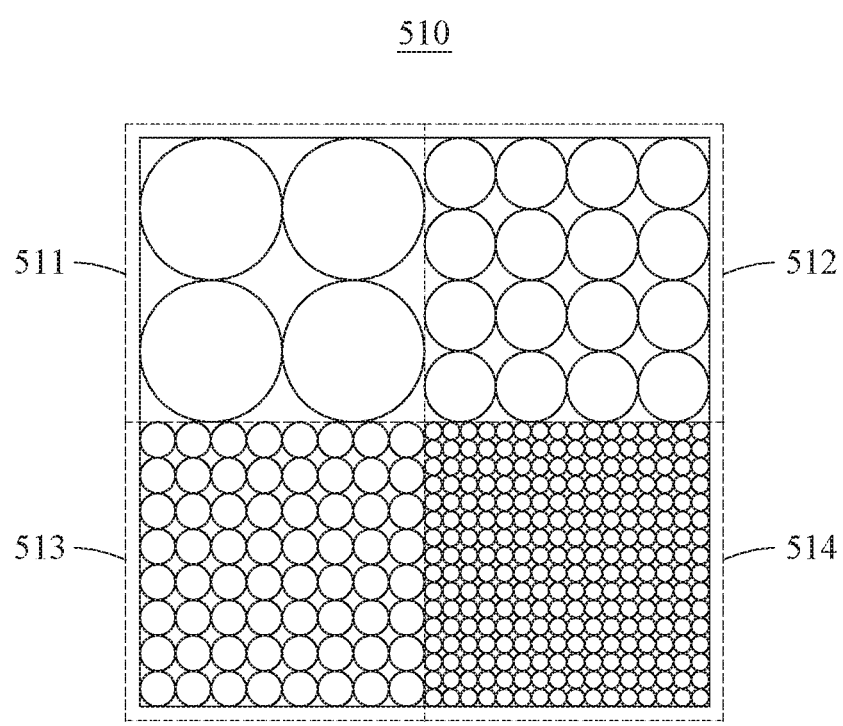
FIGS. 5A and 5B illustrate an arrangement of lens elements in a lens array according to an example embodiment and FOVs of a scene sensed by sensing elements through lens elements arranged as described above with reference to FIG. 5A.
Figure 5B:
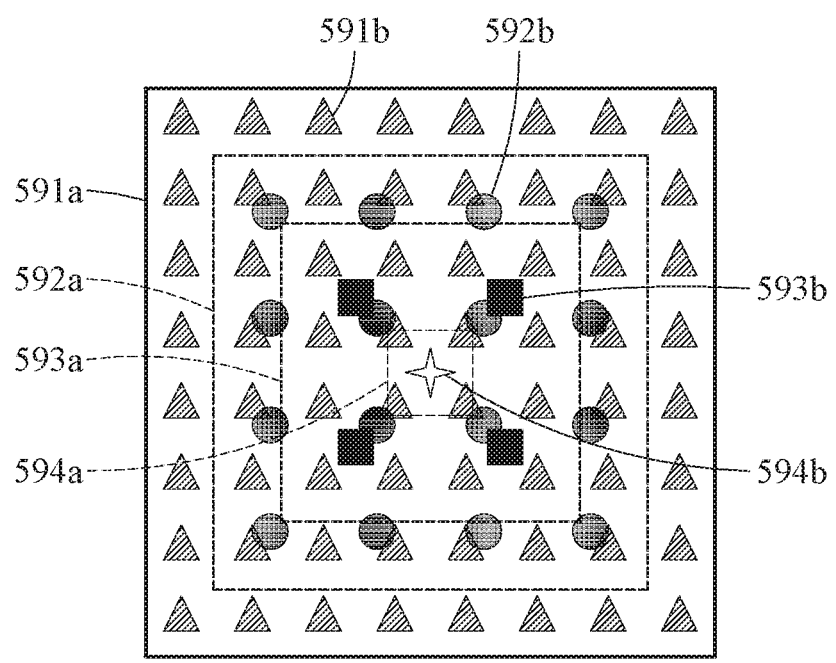

FIGS. 5A and 5B illustrate an arrangement of lens elements in a lens array according to an example embodiment and FOVs of a scene sensed by sensing elements through lens elements arranged as described above with reference to FIG. 5A.

Lens elements included in the same lens group may be arranged to be adjacent to each other. In FIG. 5A, first lens elements of a first lens group 511 with a first lens size may be arranged adjacent to each other. Lens elements included in each of the other lens groups, for example, a second lens group 512, a third lens group 513, and a fourth lens group 514, may also be arranged adjacent to each other.

FIG. 5A illustrates a top view of a structure in which a lens array 510 includes four lens groups, that is, M=4. The first lens group 511 may include four lens elements arranged in a 2×2 shape, as an example of $L_1 = 2$. The second lens group 512 may include 16 lens elements arranged in a 4×4 shape, as an example of $L_2 = 4$. Similarly, the third lens group 513 may include 64 lens elements, and the fourth lens group 514 may include 256 lens elements. Although an image sensor is implemented as a single sensor for convenience of description in FIG. 5A, example embodiments are not limited thereto. For example, the image sensor may be implemented as four individual image sensors, each including one of the above-noted lens groups, or as different types of image sensors, for example, sensors having individual sensing elements that are different in size.

For example, a processor of the image sensor may acquire a CEV image based on sensing information sensed by a plurality of sensing elements. In the present disclosure, a CEV image may refer to an image acquired by overlappingly capturing the same or a similar scene, in a manner similar to the operation of the compound eyes of an insect. For example, the image sensor may acquire a CEV image based on intensities of rays received from a plurality of sensing elements through a plurality of lenses arranged in an array.

The processor may generate a CEV image that includes 2×2 first group images obtained by sensing light received through the first lens group 511, 4×4 second group images obtained by sensing light received through the second lens group 512, 8×8 third group images obtained by sensing light received through the third lens group 513, and 16×16 fourth group images obtained by sensing light received through the fourth lens group 514. The processor may rearrange the CEV image based on LF information sensed by the plurality of sensing elements, as described above with reference to FIG. 3.

Sensing information associated with a scene and acquired through the lens array 510 of FIG. 5A is described below with reference to FIG. 5B.

FIG. 5B is a diagram illustrating FOVs of a scene sensed by sensing elements through lens elements arranged as described above with reference to FIG. 5A.

A lens array may receive light from the outside of an image sensor and may transfer the light to a sensing array. Lens elements in the lens array may have different FOVs based on a lens size. For example, referring to FIG. 5A, a first lens element included in the first lens group 511 may have a first FOV, a second lens element included in the second lens group 512 may have a second FOV, a third lens element included in the third lens group 513 may have a third FOV, and a fourth lens element included in the fourth lens group 514 may have a fourth FOV.

Sensing elements included in a sensing region covered by each lens group may sense rays corresponding to a FOV of a corresponding lens group. FIG. 5B illustrates sensing information sensed by a sensing element covered by a corresponding lens group, for each FOV of a lens group.

A first sensing element covered by the first lens element may receive rays corresponding to the first FOV through the first lens element, and may sense first sensing information 591b. The first sensing information 591b may be sensing information associated with a region 591a corresponding to the first FOV. A second sensing element may receive rays corresponding to the second FOV through the second lens element, and may sense second sensing information 592b. The second sensing information 592b may be sensing information associated with a region 592a corresponding to the second FOV. As shown in FIG. 5B, the region 592a may be smaller than the region 591a. A third sensing element may receive rays corresponding to the third FOV through the third lens element, and may sense third sensing information 593b. The third sensing information 593b may be sensing information associated with a region 593a corresponding to the third FOV, which is shown in FIG. 5B as smaller than the region 592a. Also, a fourth sensing element may receive rays corresponding to the fourth FOV through the fourth lens element, and may sense fourth sensing information 594b. The fourth sensing information 594b may be sensing information associated with a region 594a corresponding to the fourth FOV, which is shown in FIG. 5B as smaller than the third region 593a.

As shown in FIG. 5B, since sensing information is collected only by the first sensing element, in an edge portion of the region 591a outside the region 592a corresponding to the entire FOV (for example, the first FOV), a density of the collected sensing information may be less than that of a central region (for example, the region 594a corresponding to the fourth FOV). All sensing information sensed by the first sensing element through the fourth sensing element may be collected in the central region, and thus a density of the sensing information may be high relative to the edge portion. Thus, a processor of the image sensor may restore an image based on sensing information sensed by the plurality of sensing elements, so that a central region within a FOV corresponding to the lens array may have a resolution higher than a region adjacent to the central region.

In response to an input of a zoom factor from a user, the image sensor may generate a scene image that is zoomed-in based on the input zoom factor. For example, the image sensor may select target sensing information corresponding to a zoom factor designated by a user from sensing information sensed by the plurality of sensing elements. The image sensor may select information corresponding to a FOV corresponding to a zoom factor as target sensing information from the sensing information. The image sensor may restore a scene image using the selected target information. For example, when a zoom factor corresponding to the second FOV designated to the second lens group in FIG. 5B is input, the image sensor may restore the scene image based on sensing information sensed in the region 592a corresponding to the second FOV. An operation of restoring a scene image may include an operation of rearranging pixels based on a geometric structure of the image sensor, or an operation of estimating an output image from a CEV image using an image restoration model.

When a zoomed-in image (for example, an image for which a FOV decreases as the zoom factor increases) is restored, regions corresponding to FOVs provided by each lens element for the zoomed-in image may overlap. Due to the above overlapping of the regions, the image sensor may restore the zoomed-in scene image with higher resolution by simultaneously using all information from all lens groups, for example, using information from lens elements having various lens sizes.

In FIG. 5B, rays reflected or emitted from points at an infinite focal point are assumed to be received. The sensing information of FIG. 5B may include a point (hereinafter, referred to as a "sensing point") at which a point on the object at an infinite focal length is sensed. As shown in FIG. 5A, a density of sensing points may increase when the sensing points move from an outer edge of the FOV toward a central region. When rays are received from a finite focal point, a range of a FOV of each lens group of the image sensor may change.

Figure 6A:
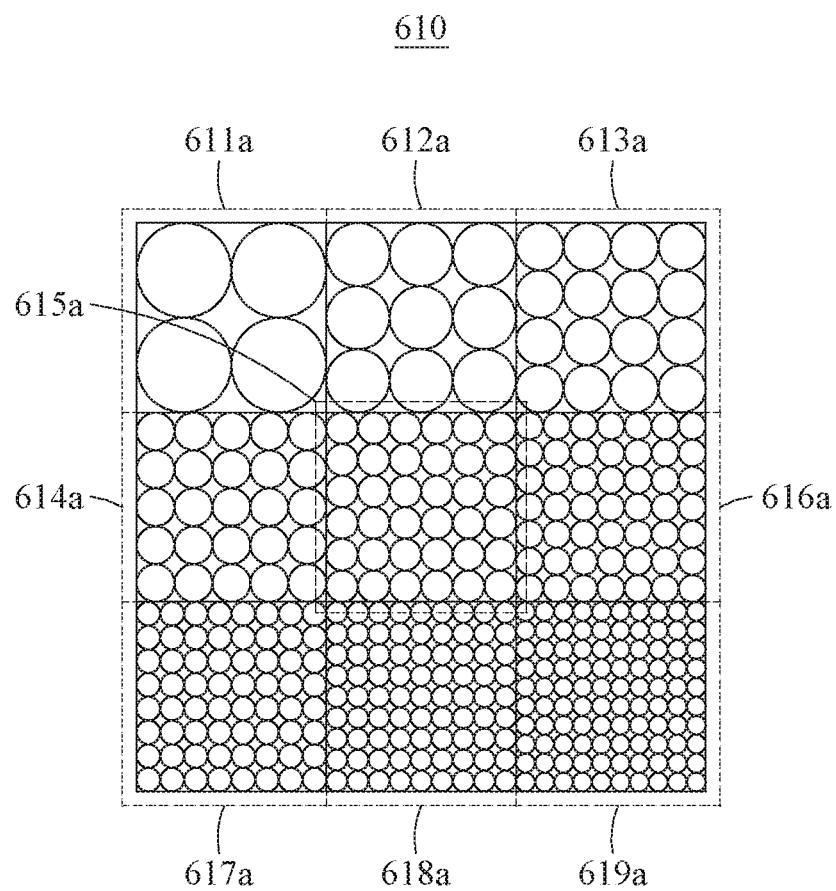
FIGS. 6A, 6B and 6C illustrate examples of an arrangement of lens elements in which overlapping of sensing points is minimized according to an example embodiment.
Figure 6B:
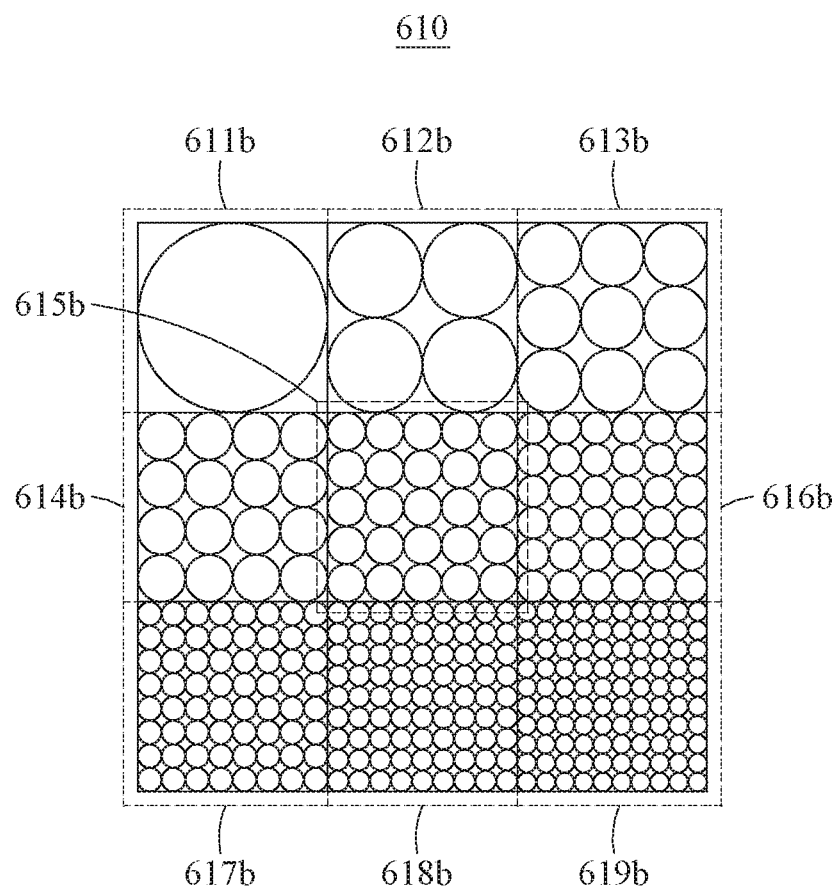
Figure 6C:
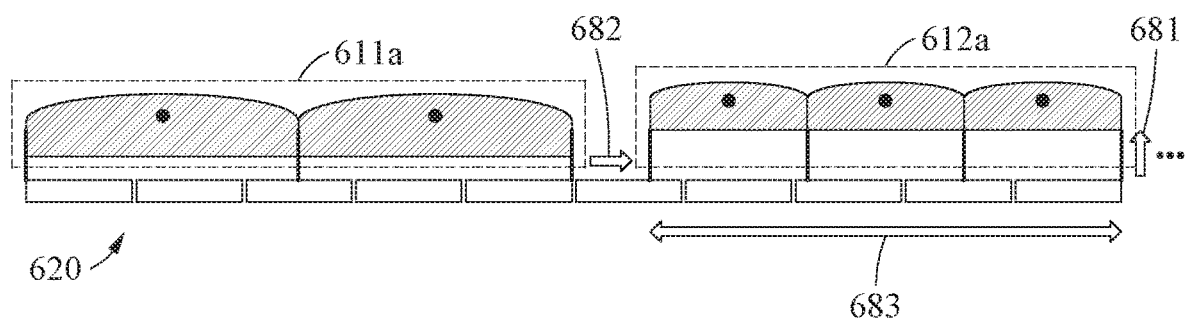

FIGS. 6A, 6B and 6C illustrate examples of an arrangement of lens elements in which overlapping of sensing points is minimized according to an example embodiment.

FIG. 6A illustrates an example in which a number of lenses arranged along one axis for each lens group is based on an arithmetic progression.

A number of sensing elements arranged along one axis of the sensing array may be determined based on the number of lenses for each of the plurality of lens groups. For example, a number of lenses in each of the plurality of lens groups and a number of sensing elements arranged along one axis may satisfy Equation 6 described above. The number of sensing elements may correspond to a resolution. Although the example in which the number of lenses arranged along one axis of each lens group is determined based on a geometric progression to satisfy Equation 9 has been described above in FIG. 5A, example embodiments are not limited thereto.

For example, a number of sensing elements arranged along one axis may be determined based on a least common multiple of the number of lenses for each of the plurality of lens groups, as shown in Equation 10 below.

$$R = L_{LCM} \times \mathbb{N}_{LCM} + 1, \; s.t. \; L = LCM(L_1, \ldots, L_M) \quad \text{[Equation 10]}$$

In Equation 10, $L_{LCM}$ denotes a least common multiple of a number of lenses included in each of the plurality of lens groups along one axis, $N_{LCM}$ denotes an arbitrary natural number, LCM( ) denotes a function indicating a least common multiple, and $L_1$ through $L_M$ each denote a number of lenses included in each of a first lens group through an M-th lens group along one axis. When Equations 6 and 10 are combined, Equation 11 may be obtained as shown below.

$$R = L_{LCM} \times \mathbb{N}_{LCM} + 1 = L_i \times \mathbb{N}_i + 1 \; s.t. \; \mathbb{N}_i = \alpha_i \times \mathbb{N}_{LCM},$$
$$L_{LCM} = \alpha_i \times L_i \quad \text{[Equation 11]}$$

In Equation 11, LLCM denotes a multiple of Li, and accordingly αi is a natural number. Ni is a product of two natural numbers, and as a result, all the lens groups satisfy Equation 6 described above. When a number of sensing elements arranged along one axis in a sensing array is determined based on a number of lenses on one axis for each of the plurality of lens groups according to Equation 11, position overlapping of sensing points for a scene may be minimized. Thus, a wider variety of information may be acquired without overlapping, and accordingly the image sensor may sense image information that enables restoration of a higher-resolution image.

Since a least common multiple condition needs to be satisfied, a number of lenses arranged along one axis may be determined based on an arithmetic progression as shown in FIG. 6A. A structure in which a number of lenses on one axis for each of the plurality of lens groups is based on an arithmetic progression may be referred to as an "arithmetic progression structure". In FIG. 6A, a first lens group 611a, a second lens group 612a, a third lens group 613a, a fourth lens group 614a, a fifth lens group 615a, a sixth lens group 616a, a seventh lens group 617a, an eighth lens group 618a, and a ninth lens group 619a may include two lenses, three lenses, four lenses, five lenses, six lenses, seven lenses, eight lenses, nine lenses, and ten lenses, respectively, along one axis. In this example, the least common multiple LLCM of 2, 3, 4, 5, 6, 7, 8, 9 and 10 may be "2520".

When a number of lenses on one axis in each of the plurality of lens groups in the image sensor is determined based on an arithmetic progression, the image sensor may more effectively restore consecutive zoom images. In an example, when a number of lenses on one axis in each of the plurality of lens groups is determined based on a geometric progression as shown in FIG. 5A, zoom factors may be set in an order of 1×, 2×, 4× and 8×, and accordingly a portion of zoom factors may be absent. In another example, when a number of lenses on one axis in each of the plurality of lens groups is determined based on an arithmetic progression as shown in FIG. 6A, a zoom factor may be set in units of 0.5×, and accordingly an image sensor including a lens array 610 of FIG. 6A may more effectively restore consecutive zoom images. Also, a zoom factor of each lens group may be determined based on a number of lenses included in a lens group corresponding to a default zoom (for example, 1× zoom). For example, a lens group corresponding to 1× zoom may include "x" lens elements, and a lens group corresponding to z× zoom may include "y" lens elements. In this example, the z× zoom may be y/x times, x may be an integer greater than or equal to "1" and y may be an integer greater than or equal to "x". The lens group corresponding to the 1× zoom may be a lens group with a minimum number of lenses among the plurality of lens groups, however, example embodiments are not limited thereto.

Also, the image sensor including the lens array 610 with the arithmetic progression structure may effectively restore a high-magnification image. For example, when a 4× zoom image is restored, a lens group corresponding to 1× zoom may include two lenses on one axis, a lens group corresponding to 2× zoom may include four lenses on one axis, and a lens group corresponding to 4× zoom may include eight lenses on one axis, in a geometric progression structure. For the same 4× zoom image, in the arithmetic progression structure, a lens group corresponding to 1× zoom may include two lenses on one axis, a lens group corresponding to 1.5× zoom may include three lenses on one axis, a lens group corresponding to 2× zoom may include four lenses on one axis, a lens group corresponding to 2.5× zoom may include five lenses on one axis, a lens group corresponding to 3× zoom may include six lenses on one axis, a lens group corresponding to 3.5× zoom may include seven lenses on one axis, and a lens group corresponding to 4× zoom may include eight lenses on one axis. In other words, in restoration of the 4× zoom image, an image sensor including a lens array 610 with the geometric progression structure may acquire "84" images corresponding to a total number of lenses, and the image sensor including the lens array 610 with the arithmetic progression structure may acquire "203" images. Thus, an amount of information used by the lens array 610 with the arithmetic progression structure may be 2.42 times that of the geometric progression structure. Even in sensing information, the lens array 610 with the arithmetic progression structure may show a more continuous and gradual change in a density of sensing points, in comparison to the lens array 610 with the geometric progression structure. Also, the image sensor including the lens array 610 with the arithmetic progression structure may use images corresponding to "9×9" lens elements included in a lens group corresponding to 4.5× zoom and images (for example, partial images of each image) corresponding to "10×10" lens elements included in a lens group corresponding to 5× zoom, to restore the 4× zoom image.

FIG. 6B illustrates an example of a lens array 610 in which one of a plurality of lens groups includes a single lens.

The lens array 610 includes a first lens group 611b that includes a single lens element, and lens groups 612b through 619b that each include a plurality of lens elements, and accordingly both a quality of a wide angle image and a quality of an image corresponding to a zoom factor may be enhanced.

Also, a number of lenses on one axis for each of the plurality of lens groups in the lens array 610 may be determined based on a progression from which at least one prime number in an arithmetic progression is excluded. For example, when a lens group corresponding to 1× zoom includes a single lens in the lens array 610, a number of lenses on one axis in the lens group may be "1". A single lens-based arithmetic progression may be 1, 2, 3, 4, 5, 6, 7, 8, 9. In the general arithmetic progression described above, a least common multiple may be "2520". A progression from which "7" that is a portion of prime numbers in an arithmetic progression is excluded may be 1, 2, 3, 4, 5, 6, 8, 9, 10. In the above-described progression from which a portion of the prime numbers is excluded, a least common multiple may be "360". A number of sensing elements included in a sensing array may be determined based on a least common multiple of a number of lenses included in lens groups according to Equation 11 described above, and thus the smaller the least common multiple, the easier selection of the number (for example, a sensor resolution) of sensing elements included in the sensing array. For example, in the first lens group 611b through a ninth lens group 619b may include one lens, four lenses, nine lenses, "16" lenses, "25" lenses, "36" lenses, "64" lenses, "81" lenses, and "100" lenses, respectively, on one axis. The lens array 610 of FIG. 6B may provide zoom factors of 1×, 2×, 3×, 4×, 5×, 6×, 8×, 9×, and 10×. Although "7" is used as a prime number excluded from an arithmetic progression has been described above, example embodiments are not limited thereto. For example, a prime number greater than or equal to "7" may be excluded.

FIG. 6C is a cross-sectional view illustrating the first lens group 611a and the second lens group 612a of FIG. 6A and a sensing array 620 that is disposed below the first lens group 611a and the second lens group 612a.

Overlapping of sensing points may be minimized by an arrangement of lens elements for each lens group. A lens element included in one lens group may represent a field of view (FOV) different from that of a lens element included in another lens group. A density of sensing points may vary depending on an area covered by an individual lens group. Also, a parameter of a lens array may be determined such that overlapping of sensing points in each lens group may be minimized. The parameter of the lens array may include, for example, a gap 682 between lens groups, a focal length 681 of an individual lens group, or a number of sensing elements included in a sensing area 683 covered by a lens group in the sensing array 620.

For example, the lens groups may be spaced apart from each other on a plane corresponding to the lens array. A lens group may be disposed at a position shifted by a sub-pixel unit from another lens group along a vertical axis (for example, a y-axis) and/or a horizontal axis (for example, an x-axis) on the above-described plane. The sub-pixel unit may be less than an integer pixel unit. For example, a length of a pitch of a sensing element may be an integer pixel unit, and the sub-pixel unit may indicate a length less than the pitch of the sensing element.

Although all the lens elements have the same focal length, for example, the focal length 681, in FIG. 6C, example embodiments are not limited thereto. For example, a focal length of at least one lens group among lens groups may be different from a focal length of another lens group. Since a FOV of a lens element included in a lens group changes based on the focal length 681, overlapping of sensing points may be minimized by a design of the focal length 681.

Also, the sensing area 683 covered by each of all the lens groups has the same size and a number of sensing elements covered by each of the lens groups is the same in FIG. 6C, however, example embodiments are not limited thereto. For example, a number of sensing elements included in a sensing area covered by at least one lens group among the lens groups may be different from a number of sensing elements covered by another lens group.

As described above, the parameter of the lens array, for example, the gap 682, the focal length 681, or a number of sensing elements covered by the lens groups, may be set such that overlapping of sensing points may be minimized in a design and manufacturing of an image sensor.

FIGS. 7 through 10 are diagrams illustrating examples of an arrangement of lens elements according to an example embodiments.

Figure 7:
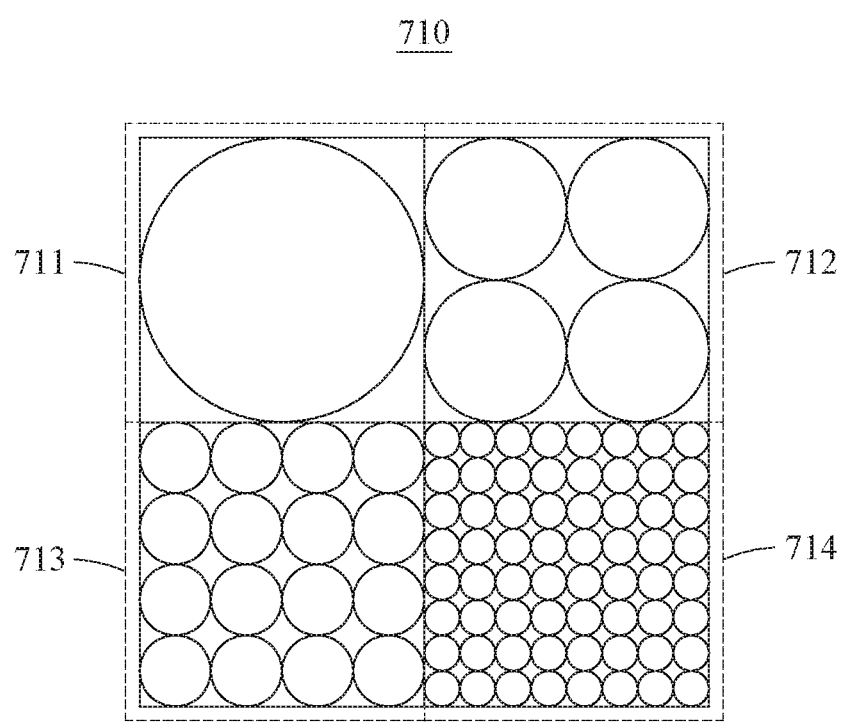
FIGS. 7 through 10 are diagrams illustrating examples of an arrangement of lens elements according to example embodiments.

In a lens array 710 of FIG. 7, one of a plurality of lens groups may include a single lens element. For example, a first lens group 711 may include a single lens element. Each of the other lens groups 712, 713 and 714 may include a plurality of lens elements, as described above. Thus, an image sensor may restore a scene image based on sensing information sensed through the lens array 710 having a structure of FIG. 7 so that both a quality of a wide angle image and a quality of an image corresponding to a zoom factor may be enhanced. Based on a structure of FIG. 7, overlapping of sensing points may also be minimized by an arrangement of lens elements for each lens group.

Figure 8:
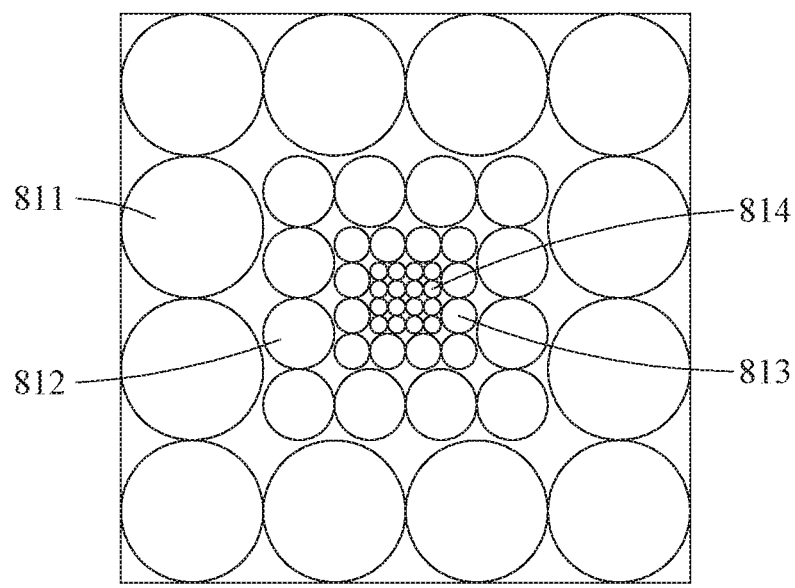

In a lens array 810 of FIG. 8, lens elements may be arranged based on a lens size. For example, one lens element from among a plurality of lens elements may be located closer to a central position of the lens array 810 than another lens element that has a lens size greater than a lens size of the one lens element. Also, one lens element among the plurality of lens elements may be located farther away from the central position of the lens array 810 than another lens element that has a lens size less than a lens size of the one lens element.

Referring to FIG. 8, first lens elements 811 included in a first lens group having a greatest first lens size among four lens groups may be located on an edge of the lens array 810. Second lens elements 812 having a second lens size less than the first lens size may be located closer to the central position than the first lens elements 811. Third lens elements 813 having a third lens size less than the second lens size may be located closer to the central position than the second lens elements 812. Fourth lens elements 814 having a fourth lens size less than the third lens size may be located closer to the central position than the third lens elements 813.

Figure 9:
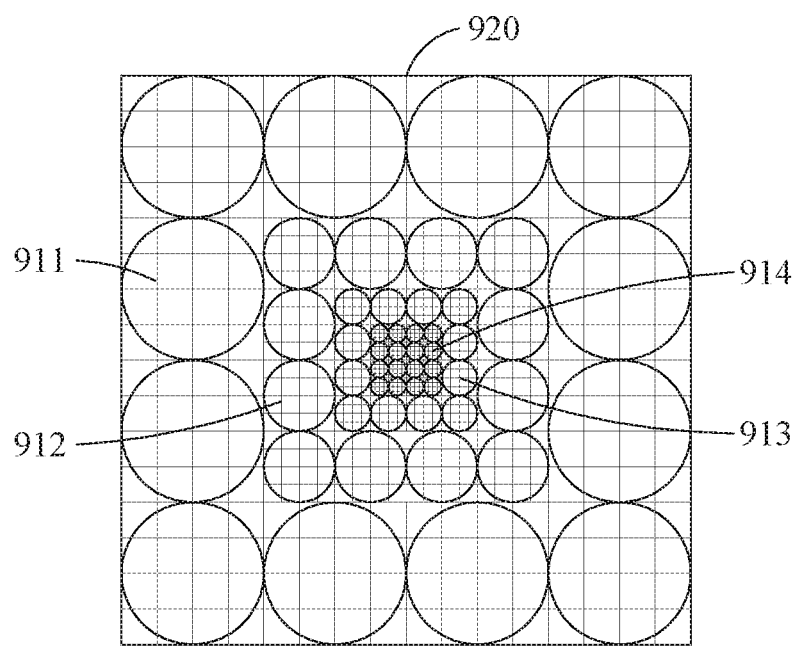

A lens array of FIG. 9 may include lens elements that are arranged in the same way as or in a similar way to the lens array 810 of FIG. 8. In FIG. 9, each of a plurality of lens elements may cover the same number of sensing elements. For example, each of first lens elements 911 may cover 16 sensing elements arranged in a 4×4 shape. Similarly, each of second lens elements 912, third lens elements 913, and fourth lens elements 914 may also cover 16 sensing elements. In this example, a size of a sensing element in a sensing array 920 may be designed so that the same number of sensing elements may be covered by every lens element. For example, a first size (for example, a pixel size) of a first sensing element covered by a first lens element 911 may be greater than a second size of a second sensing element covered by a second lens element 912. Also, a third size of a third sensing element may be less than the second size, and a fourth size of a fourth sensing element may be less than the third size. In the present disclosure, a size of a sensing element may be, for example, a pixel pitch of the sensing element. According to an example embodiment, a lens element that provides a small FOV may cover the same number of sensing elements as that of a lens element that provides a large FOV. Thus, a degree of a decrease in a resolution due to multiple lenses may be reduced and a quality of a scene image to be restored may be enhanced.

Although a number of sensing elements covered by each of the lens elements is set to an integer as shown in FIG. 9 for convenience of description, example embodiments are not limited thereto. For example, each of the lens elements may cover a fractional number of sensing elements.

Figure 10:
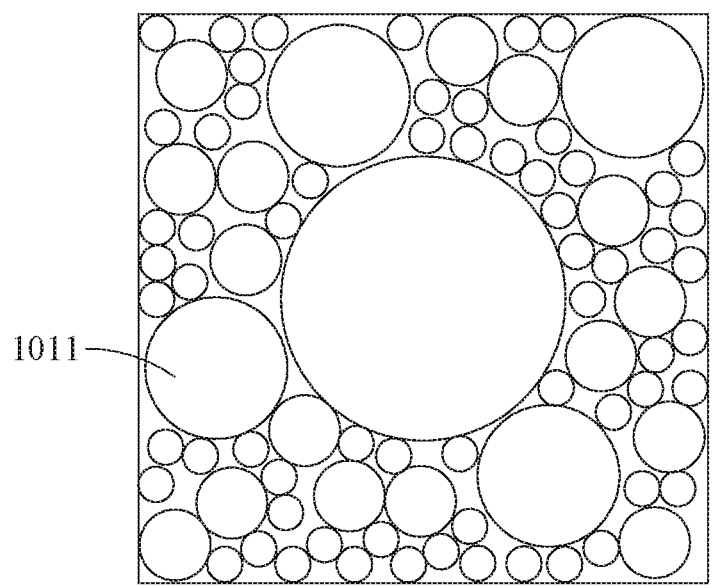

In a lens array 1010 of FIG. 10, each of a plurality of lens elements 1011 may be randomly arranged with respect to a plurality of sensing elements on a plane corresponding to the lens array 1010. A number of lens elements 1011 may satisfy Equation 9 for each lens size, and the lens elements 1011 may be arranged on a plane of the lens array 1010. Based on a portion of random arrangements of lenses, an image sensor may restore a scene image with a high resolution uniformly regardless of zoom factors supported by an individual lens size as well as a wide angle.

Figure 11:
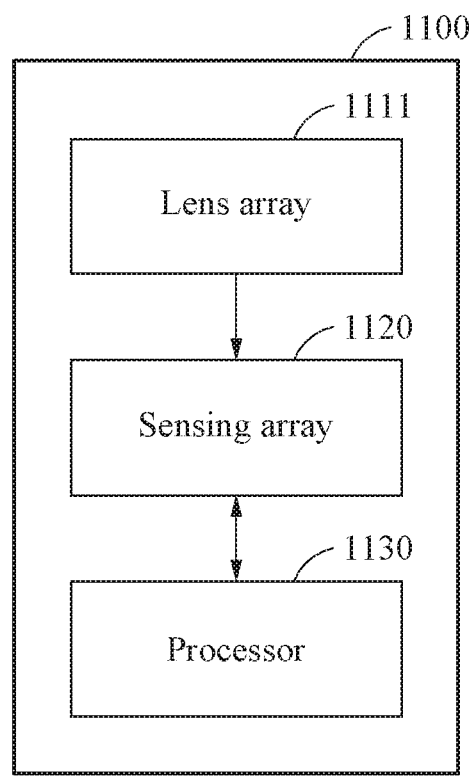
FIG. 11 is a block diagram illustrating a structure of an image sensor according to an example embodiment.

FIG. 11 is a block diagram illustrating a structure of an image sensor according to an example embodiment.

Referring to FIG. 11, an image sensor 1100 includes a lens array 1111, a sensing array 1120, and a processor 1130.

Referring to FIG. 11, a lens array 1111 may include a plurality of lens elements. The plurality of lens elements may be located on a lens plane. All the plurality of lens elements may have the same or similar focal lengths. A plurality of lens elements may be designed to have the same focal lengths, but the focal lengths may be slightly different from each other due to a manufacturing tolerance. For example, a difference between focal lengths of the plurality of lens elements may be less than a threshold error. As described above, a lens size of at least one of the plurality of lens elements may be different from a lens size of at least one other lens element. Each of the plurality of lens elements may refract light and form a focal point at a point on the sensing array 1120 including a plurality of sensing elements.

The sensing array 1120 may include a plurality of sensing elements. The plurality of sensing elements may be located on a sensing plane parallel to a lens plane. The plurality of sensing elements may be located on the sensing plane spaced apart from the lens array 1111 by a distance equal to the focal length of the lens elements. Each of the plurality of sensing elements may sense light passing through the lens array 1111. For example, each of the plurality of sensing elements may receive light passing through a lens element that covers a corresponding sensing element.

The processor 1130 may restore a scene image based on an intensity of light sensed by the plurality of sensing elements. For example, the processor 1130 may acquire a CEV image based on sensing information sensed by the plurality of sensing elements. The processor 1130 may restore the scene image from the CEV image. The scene image may be an image output from the image sensor 1100, and may be restored to be the same as or similar to the original scene.

In an example, the processor 1130 may restore a scene image from a CEV image based on a geometric structure between the plurality of sensing elements and the plurality of lens elements. For example, the processor 1130 may rearrange pixels of a captured image (for example, a CEV image) to generate an output image wherein pixels of sensing elements that sense similar LF information from among the plurality of sensing elements may be rearranged to be adjacent to each other, as described above with reference to FIG. 3.

In another example, the processor 1130 may restore a scene image from a CEV image based on an image restoration model that is completely trained before the CEV image is acquired. The image restoration model may be a model designed to output a scene image corresponding to an arbitrary CEV image, and may have a machine learning structure. For example, the image restoration model may have a neural network structure. The image restoration model may be trained to output a reference output image given as a ground truth in response to an input of an arbitrary reference CEV image. However, the image restoration model is not limited thereto.

Figure 12:
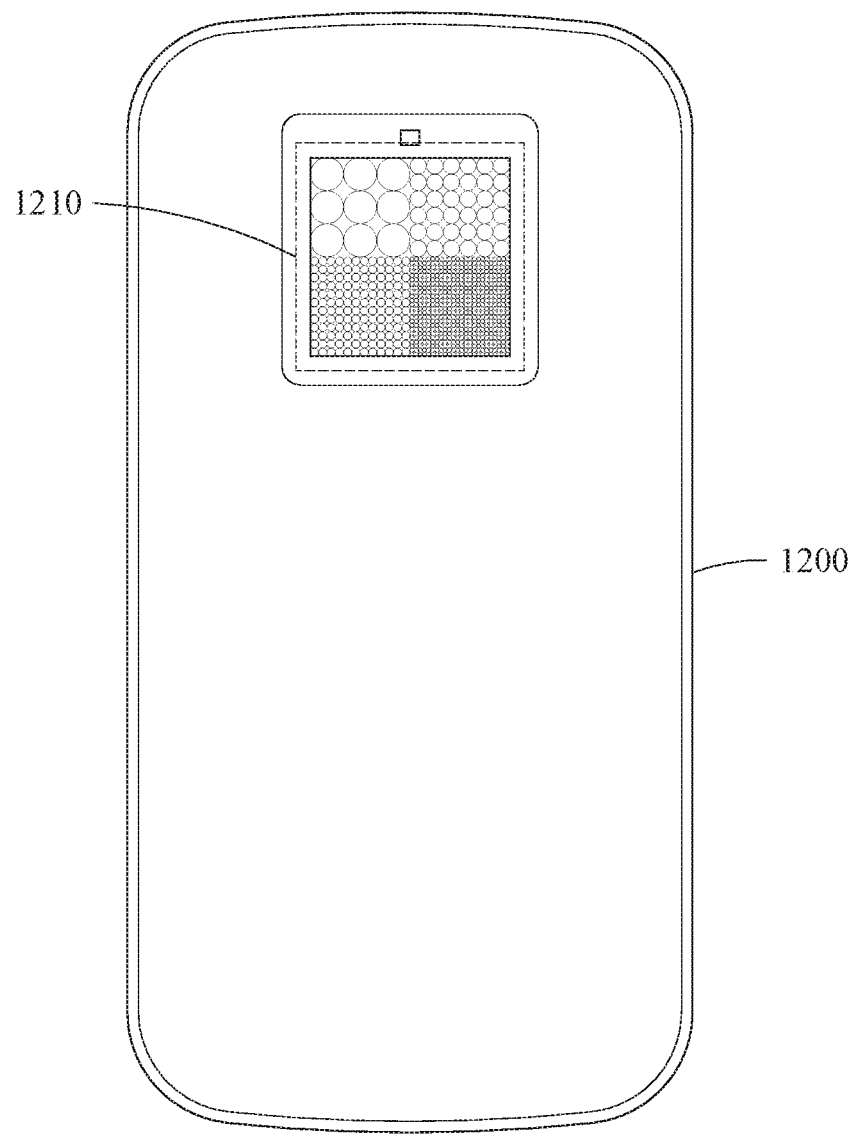
FIGS. 12 and 13 are diagrams illustrating examples of an apparatus in which an image sensor is implemented according to an example embodiment.
Figure 13:
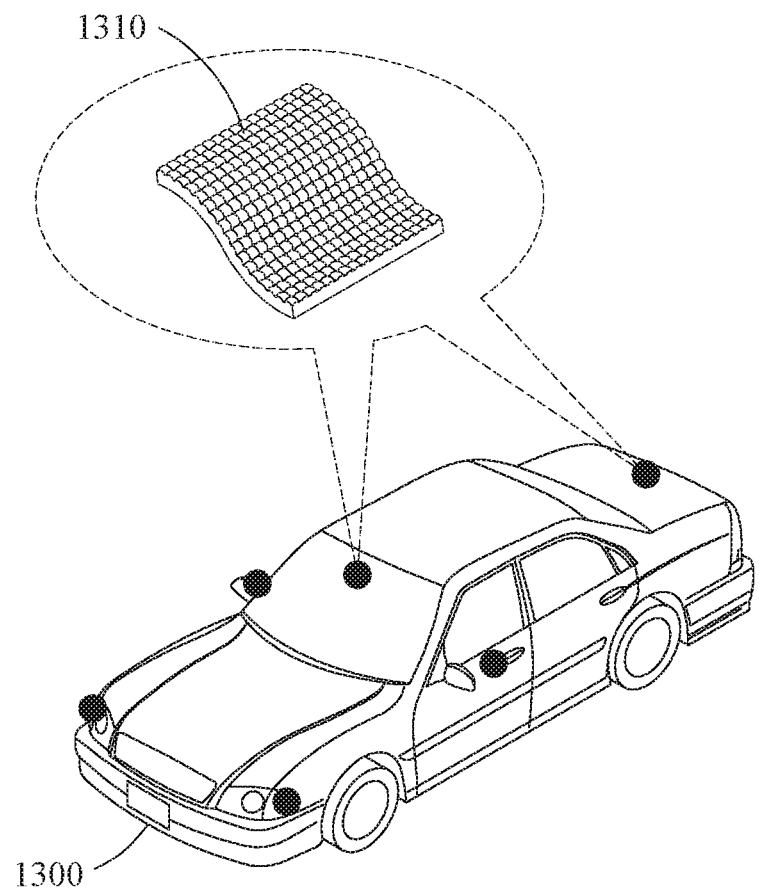

FIGS. 12 and 13 are diagrams illustrating examples of an apparatus in which an image sensor is implemented according to an example embodiment.

An image sensor may be applicable to various technical fields. The image sensor may be designed so that a lens array including a plurality of lenses may be spaced apart from a sensor including a plurality of sensing elements by a relatively small distance equal to the focal length of the lens elements in the lens array. For example, the image sensor may be implemented as an ultra-thin camera with a large sensor for high-definition capturing. In other words, a thickness of the image sensor may be reduced using a multi-lens array structure. The image sensor may be implemented as an application processor (AP), a field-programmable gate array (FPGA) or a chip, and may be used as an image signal processor of a camera.

Also, the image sensor may acquire sensing information associated with a plurality of zoom factors using a lens array that has an ultra-thin structure and lens elements that have different lens sizes and the same focal length. Thus, the image sensor may restore a high resolution scene image with respect to the plurality of zoom factors.

In an example, the image sensor may be implemented in a mobile terminal. The mobile terminal may be a terminal movable instead of being fixed at any geographical position, and may include, for example, a portable device (for example, a smart device, such as a smartphone or a tablet computer), an artificial intelligence speaker, or a vehicle. Examples of a mobile terminal are shown in FIGS. 12 and 13, however, example embodiments are not limited thereto.

Referring to FIG. 12, an image sensor 1210 may be applied to a front camera or rear camera of a smartphone. The image sensor 1210 may have a structure in which a large full frame sensor and a micro-lens array are combined, and may be applied to a camera of a mobile phone. For example, the image sensor 1210 may be included in a front camera or rear camera of a smart device 1200, as shown in FIG. 12. A sensing array and a lens array of the image sensor 1210 may be implemented as, for example, a full-frame sensing array and a micro lens array, respectively.

In another example, the image sensor may have a thin structure or a curved structure and may be implemented for vehicles. Referring to FIG. 13, an image sensor 1310 may be implemented as a curved front camera or rear camera of a vehicle 1300. However, example embodiments are not limited thereto, and the image sensor 1310 may be used in, for example, a digital single-lens reflex (DSLR) camera, a drone, a closed-circuit television (CCTV), a webcam camera, a panoramic camera, a camera for movies or broadcasts, or a virtual reality/augmented reality (VR/AR) camera. Also, the image sensor 1310 may be applicable to various fields, for example, a flexible/stretchable camera, a compound-eye camera, or a contact lens type camera.

In still another example, the image sensor may also be applicable to a multi-frame super resolution image restoration for increasing a resolution of a video image based on information about a plurality of consecutive frames that are captured.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, a processing device is described as a single processing device; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording media.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. An image sensor comprising:
a lens array comprising a plurality of lens groups, each of the plurality of lens groups comprising at least one lens element; and a sensing array comprising a plurality of sensing elements spaced apart from the lens array and configured to sense light passing through the lens array, wherein a lens size of one lens group from among the plurality of lens groups is different from a lens size of another lens group from among the plurality of lens groups, wherein a number of sensing elements arranged along one axis of the sensing array is determined based on a number of lenses for each lens group of the plurality of lens groups, wherein the number of lenses of each lens group of the plurality of lens groups is different from the number of lenses of each other lens group of the plurality of lens groups, and wherein the number of sensing elements arranged along the one axis of the sensing array is determined based on a least common multiple of the number of lenses for each of the plurality of lens groups.

2. The image sensor of claim 1, wherein the number of lenses for each of the plurality of lens groups is determined based on a geometric progression.

3. The image sensor of claim 1, wherein the number of lenses for each of the plurality of lens groups is determined based on an arithmetic progression.

4. The image sensor of claim 1, wherein the number of lenses for each of the plurality of lens groups is determined based on a progression from which at least one prime number in an arithmetic progression is excluded.

5. The image sensor of claim 1, wherein the number of lenses for each of the plurality of lens groups is determined based on a progression that is based on a number of lenses included in a lens group corresponding to a default zoom.

6. The image sensor of claim 1, wherein each lens group from among the plurality of lens groups corresponds to a respective lens size such that for each lens group from among the plurality of lens groups, lens elements included in the lens group have the corresponding lens size.

7. The image sensor of claim 1, wherein for each lens group from among the plurality of lens groups, lens elements included in the lens group are located adjacent to each other.

8. The image sensor of claim 1, wherein one lens group from among the plurality of lens groups comprises a single lens element.

9. The image sensor of claim 1, wherein the at least one lens element is arranged to cover less than an entire portion of at least one sensing element from among the plurality of sensing elements.

10. The image sensor of claim 1, further comprising:
a processor configured to restore an image based on sensing information sensed by the plurality of sensing elements so that a resolution of a central region within a field of view (FOV) of the lens array is higher than a resolution of a region adjacent to the central region.

11. The image sensor of claim 1, further comprising:
a processor configured to acquire a compound eye vision (CEV) image based on sensing information sensed by the plurality of sensing elements.

12. The image sensor of claim 11, wherein the processor is further configured to rearrange pixels included in the CEV image based on light field (LF) information sensed by the plurality of sensing elements.

13. The image sensor of claim 11, wherein the processor is further configured to restore a scene image from the CEV image based on a geometric relationship between the plurality of sensing elements and the plurality of lens groups.

14. The image sensor of claim 11, wherein the processor is further configured to restore a scene image from the CEV image based on an image restoration model that is completely trained before the CEV image is acquired.

15. The image sensor of claim 1, further comprising:
a processor configured to select target sensing information from among sensing information sensed by the plurality of sensing elements, the target sensing information corresponding to a zoom factor designated by a user,
wherein the processor is further configured to restore a scene image based on the selected target sensing information.

16. The image sensor of claim 15, wherein the processor is further configured to select, as the target sensing information, information corresponding to a field of view corresponding to the designated zoom factor.

17. The image sensor of claim 1, wherein each lens element from among the plurality of lens groups is configured to refract incident light and to form a focal point of light exiting the lens element at a point on the sensing array comprising the plurality of sensing elements.

18. An image sensing method comprising:
sensing, by a sensing array comprising a plurality of sensing elements, light passing through a lens array comprising a plurality of lens groups, each comprising at least one lens element; and
restoring, by a processor, a scene image based on an intensity of the light sensed by the sensing array,
wherein a lens size of one lens group from among the plurality of lens groups is different from a lens size of another lens group from among the plurality of lens groups,
wherein a number of sensing elements arranged along one axis of the sensing array is determined based on a number of lenses for each of the plurality of lens groups,
wherein the number of lenses of each lens group of the plurality of lens groups is different from the number of lenses of each other lens group of the plurality of lens groups, and
wherein the number of sensing elements arranged along the one axis of the sensing array is determined based on a least common multiple of the number of lenses for each of the plurality of lens groups.

19. A camera comprising:
a lens array comprising a plurality of lens groups, each of the plurality of lens groups comprising at least one lens element; and
a sensing array comprising a plurality of sensing elements spaced apart from the lens array and configured to sense light passing through the lens array,
wherein a lens size of one lens group from among the plurality of lens groups is different from a lens size of another lens group from among the plurality of lens groups,
wherein a number of sensing elements arranged along one axis of the sensing array is determined based on a number of lenses for each of the plurality of lens groups,
wherein the number of lenses of each lens group of the plurality of lens groups is different from the number of lenses of each other lens group of the plurality of lens groups, and
wherein the number of sensing elements arranged along the one axis of the sensing array is determined based on a least common multiple of the number of lenses for each of the plurality of lens groups.

\* \* \* \* \*